US009288111B2

(12) United States Patent
Iovanna et al.

(10) Patent No.: US 9,288,111 B2
(45) Date of Patent: Mar. 15, 2016

(54) SUMMARIZATION IN A MULTI-DOMAIN NETWORK

(75) Inventors: Paola Iovanna, Rome (IT); Giulio Bottari, Leghorn (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 279 days.

(21) Appl. No.: 13/579,804

(22) PCT Filed: Feb. 23, 2010

(86) PCT No.: PCT/EP2010/052287
§ 371 (c)(1),
(2), (4) Date: Dec. 7, 2012

(87) PCT Pub. No.: WO2011/103913
PCT Pub. Date: Sep. 1, 2011

(65) Prior Publication Data
US 2013/0070638 A1    Mar. 21, 2013

(51) Int. Cl.
G06F 15/173    (2006.01)
G06F 15/16    (2006.01)
(Continued)

(52) U.S. Cl.
CPC ............... *H04L 41/12* (2013.01); *H04L 45/02* (2013.01); *H04L 45/04* (2013.01); *H04L 41/022* (2013.01)

(58) Field of Classification Search
CPC ......... H04L 41/04; H04L 41/12; H04L 45/04; H04L 45/02
USPC ........................................................ 370/254
See application file for complete search history.

(56) References Cited

U.S. PATENT DOCUMENTS

| 6,456,600 B1 * | 9/2002 | Rochberger | H04L 45/02 370/238.1 |
| 7,752,024 B2 * | 7/2010 | Ball | H04L 41/12 703/1 |

(Continued)

FOREIGN PATENT DOCUMENTS

| WO | 03/049342 A2 | 6/2003 |
| WO | 2006/102398 A2 | 9/2006 |
| WO | 2009/118050 A1 | 10/2009 |

OTHER PUBLICATIONS

PCT International Search Report, mailed Nov. 11, 2010, in connection with International Application No. PCT/EP2010/052287.

(Continued)

*Primary Examiner* — Brian Roberts
*Assistant Examiner* — Abu-Sayeed Haque
(74) *Attorney, Agent, or Firm* — Leffler Intellectual Property Law, PLLC

(57) ABSTRACT

A multi-domain network comprises domains of different network technology types. A network domain comprises a plurality of network nodes connected by links and comprising border nodes which connect with other network domains. In a first domain (AS A) of a first technology type, a method comprises determining an intra-domain topology of the nodes and links of the domain by collecting values of at least one network topology parameter of the first technology type. The method determines a summarized intra-domain topology of paths between border nodes of the domain which is described using values of at least one summarized network topology parameter. Values of the summarized network topology parameter are derived from the values of the network topology parameter of the intra-domain topology of the first technology type. The summarized network topology parameter is part of a common set of network topology parameters for advertising between domains comprising apparatus of different technology types. A domain can comprise multiple layers of different technology type.

22 Claims, 7 Drawing Sheets

(51) Int. Cl.
*H04L 12/28* (2006.01)
*H04L 12/24* (2006.01)
*H04L 12/751* (2013.01)
*H04L 12/715* (2013.01)

(56) References Cited

U.S. PATENT DOCUMENTS

| | | | | |
|---|---|---|---|---|
| 7,978,615 | B2* | 7/2011 | He | H04L 45/00 370/242 |
| 8,014,275 | B1* | 9/2011 | Sundt | H04L 41/0668 370/217 |
| 8,462,621 | B2* | 6/2013 | Ramakrishnan | H04L 45/00 370/217 |
| 2002/0097747 | A1* | 7/2002 | Kirkby | H04L 12/5695 370/468 |
| 2005/0122981 | A1* | 6/2005 | Nabae | H04L 45/04 370/395.31 |
| 2005/0152284 | A1* | 7/2005 | Kotha | H04L 12/4641 370/254 |
| 2006/0153067 | A1* | 7/2006 | Vasseur | H04L 12/5695 370/217 |
| 2006/0262735 | A1* | 11/2006 | Guichard | H04L 12/66 370/254 |
| 2008/0219272 | A1* | 9/2008 | Novello | H04L 47/11 370/401 |
| 2009/0067348 | A1* | 3/2009 | Vasseur | H04L 45/04 370/256 |
| 2009/0285574 | A1* | 11/2009 | Liu | H04J 3/1652 398/2 |
| 2010/0080222 | A1* | 4/2010 | Mohapatra | H04L 12/4641 370/392 |
| 2010/0290485 | A1* | 11/2010 | Martini | H04L 12/4641 370/477 |
| 2011/0019674 | A1* | 1/2011 | Iovanna | H04L 45/12 370/392 |

OTHER PUBLICATIONS

Bernstein, G. et al. "Optical Inter Domain Routing Considerations; draft-ieff-ipo-optical-inter-domain-01.txt" IETF Standard-Working-Draft, Internet Engineering Task Force, IEFT, CH, vol. ipo, No. 1, Feb. 1, 2002, XP015020470 ISSN: 0000-0004.

Maier, G. et al. "Multi-domain routing techniques with topology aggregation in ASON networks" 2008 International Conference on Optical Network Design and Modeling, IEEE, Piscataway, NJ, USA, Mar. 12, 2008, pp. 1-6, XP031291157, ISBN: 978-3-901882-27-2.

Awduche, M. et al. "RSVP-TE: Extensions to RSVP for LSP Tunnels; rfc3209.txt" IETF Standard, Internet Engineering Task Force, IETF, CH, Dec. 1, 2001, XP015008988, ISSN: 0000-0003.

Optical Internetworking Forum External Network-Network Interface (E-NNI) OSPFv2-based Routing—2.0 (Intra-Carrier) Implementation Agreement, Jul. 13, 2011.

Farrel, A. et al. "A Path Computation Element (PCE)-Based Architecture" RFC 4655, Network Working Group, Aug. 2006.

* cited by examiner

SUMMARIZATION IN A MULTI-DOMAIN NETWORK

TECHNICAL FIELD

This invention relates to multi-domain communication networks and to sharing of information between domains in such a network.

BACKGROUND

With the advent of new network applications and services, end users are demanding high bandwidth end-to-end connections that need to be provisioned automatically and dynamically. An end-to-end connection may need to cross networks which belong to different operators. Typically, each operator manages their network independently of other operators. Each independently-operated network is called an Autonomous System (AS) or a domain. A network comprising a set of Autonomous Systems is called a multi-domain network.

The routing strategies applied within a single domain cannot be simply applied to a multi-domain scenario because of the scalability problems that arise in very extensive and complex topologies. The amount of topology information to be distributed and the frequency of updates would increase the overhead of the entire network signalling and thus the bandwidth request and the computational power consumed. In addition, there can be commercial reasons that prevent a domain administrator from sharing full details of their intra-domain topology with another domain administrator.

Although it is desirable to limit the amount of topology information that is shared between domains, it is also desirable that domains share sufficient information about their domains to allow efficient traffic engineering across a multi-domain network.

A further complication in a multi-domain network is that different domains within the multi-domain network may use different technology types. Possible technology types include packet-based transport and optical technologies such as wavelength-switched optical networks (WSON).

A further complication is that a single domain within the multi-domain network can itself use multiple technology types. This kind of domain will be called a multi-layer domain and can have, for example, a packet-switched layer and a wavelength-switched layer. This kind of domain can also have a multi-layer control plane which controls both technology types, such as a GMPLS multi-layer control plane. A still further complication is that a multi-layer domain can comprise internal nodes with different switching capability (e.g. packet and WSON) and border nodes having just one switching capability (e.g. WSON). For the sake of scalability and confidentiality it is desirable not to advertise the internal topology. Moreover multi-layer networks can be composed by technologies with different features that make the routing complex if it is performed concurrently. For example in case of packet over WSON, due to different granularity and constraints of the two technologies, different routing methods could be considered.

The present invention seeks to provide a way of sharing topology information in a multi-domain, multi-technology, network.

SUMMARY

A first aspect of the present invention provides a method of generating network topology parameters for a first network domain in a multi-domain network. The first network domain comprises a plurality of network nodes connected by links and comprising border nodes which connect with other network domains. The first network domain comprises apparatus of a first network technology type. The method comprises, at a control entity (RC A) of the first network domain (AS A), determining an intra-domain topology of the nodes and links of the first network domain by collecting values of at least one network topology parameter of the first technology type. The method also comprises determining a summarised intra-domain topology of paths between border nodes of the first network domain which is described using values of at least one summarised network topology parameter. Values of the summarised network topology parameter are derived from the values of the network topology parameter of the intra-domain topology of the first technology type. The summarised network topology parameter is part of a common set of network topology parameters for advertising between domains comprising apparatus of different technology types.

The method simplifies routing of an end-to-end service across a multi-domain network in which the domains use a mix of different technology types. The domains can have at least one of: their own peculiar policies; technology-related behaviours; parameters; and control plane model. Use of a set of common parameters simplifies the exchange of topology information and simplifies the calculation and comparison of routes across multiple domains. Advantageously, the set of common parameters are based on User-Network Interface (UNI) service parameters such as guaranteed bandwidth and delay.

Advantageously, the method comprises advertising a path of the summarised intra-domain topology to another network domain, the advertisement specifying a value, or value range, of the least one summarised network topology parameter for the intra-domain path. Multiple possible intra-domain paths are grouped into "baskets" according to value, or value range. The value, or value range, of a basket is advertised to other domains. This reduces the amount of topology information that is advertised, while still allowing traffic engineering flexibility for multi-domain routes and preserving confidentiality for domain administrators.

Advantageously, there is a common model, based on the set of common parameters, that allows a uniform representation of heterogeneous technologies and domains.

Advantageously, the summarisation procedure allows an intra-domain routing which is independent and asynchronous with respect to inter-domain routing. A domain can provide an intra-domain path which meets the summarised topology and corresponding service parameters taking into account internal policy and proper physical constraints. Intra-domain connections can be pre-computed in advance, partially computed in advance, or fully computed in real-time. The internal parameters used for intra-domain routing can be physical impairments (in case of optical networks), or others. In this way inter-domain topology is "quasi-static" and based on homogenous parameters, while intra-domain routing is completely independent from other domains, and based on different parameters (e.g. available bandwidth, network load, etc.) with respect to inter-domain routing.

Another aspect of the invention provides a method of operating a route advertising control entity of a first network domain in a multi-domain network. The method comprises advertising a value, or value range, of a summarised network topology parameter for an intra-domain path of a summarised intra-domain topology of paths between border nodes of the first domain to another network domain.

Another aspect of the invention provides a method of operating a routing control entity of a first network domain in a multi-domain network. The first network domain comprises a plurality of network nodes connected by links. The network domain comprises apparatus of a first network technology type. The method comprises receiving a request for an intra-domain routing between border nodes of the first domain as part of an inter-domain routing between end nodes. The request specifies an advertised value, or value range, of a summarised network topology parameter for the routing. The summarised network topology parameter is part of a common set of network topology parameters used by domains of different technology types. The method further comprises determining an intra-domain path between the border nodes which meets the requested value, or value range, of the summarised network topology parameter.

A domain is typically defined as a part of a network under the control of a particular network operator. In a network domain comprising equipment from different vendors, it can be convenient to represent the single network domain as multiple domains, with each domain comprising equipment of a single vendor. In any of the embodiments of the invention, the multiple domains can be a set of domains which are under the control of a common operator, with each domain comprising equipment of a particular vendor.

The term "technology type" is intended to cover different types of transport plane switching capability (packet switched and wavelength switched) and/or control plane type (single layer, multi-layer, multi-technology). The term "technology type" is also intended to cover equipment of a particular vendor. Equipment supplied by different vendors can use nominally similar transport plane technologies (e.g. packet-switched) but can operate in different ways, due to differences between the ways that vendors implement features. Accordingly, a first technology type can be packet-switched equipment provided by vendor A and a second technology type can be packet-switched equipment provided by vendor B.

The functionality described here can be implemented in hardware or by a combination of hardware and software executed by a processing apparatus. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

A further aspect of the invention provides apparatus for generating network topology parameters for a first network domain in a multi-domain network. The first network domain comprises a plurality of network nodes connected by links and comprising border nodes which connect with other network domains. The first network domain comprises apparatus of a first network technology type. The apparatus comprises a processing apparatus and memory which is arranged to determine an intra-domain topology of the nodes and links of the first network domain by collecting values of at least one network topology parameter of the first technology type. The apparatus is further arranged to determine a summarised intra-domain topology of paths between border nodes of the first network domain which is described using values of at least one summarised network topology parameter, wherein values of the summarised network topology parameter are derived from the values of the network topology parameter of the intra-domain topology of the first technology type.

A further aspect of the invention provides a routing control entity of a first network domain in a multi-domain network. The first network domain comprises a plurality of network nodes connected by links. The network domain comprises apparatus of a first network technology type. The routing control entity comprises a processing apparatus and memory which is arranged to receive a request for an intra-domain routing between border nodes of the first domain as part of an inter-domain routing between end nodes. The request specifies an advertised value, or value range, of a summarised network topology parameter for the routing. The summarised network topology parameter is part of a common set of network topology parameters used by domains of different technology types. The routing control entity is further arranged to determine an intra-domain path between the border nodes which meets the requested value, or value range, of the summarised network topology parameter.

BRIEF DESCRIPTION OF THE DRAWINGS

Embodiments of the invention will be described, by way of example only, with reference to the accompanying drawings in which.

DETAILED DESCRIPTION

Figure 1:
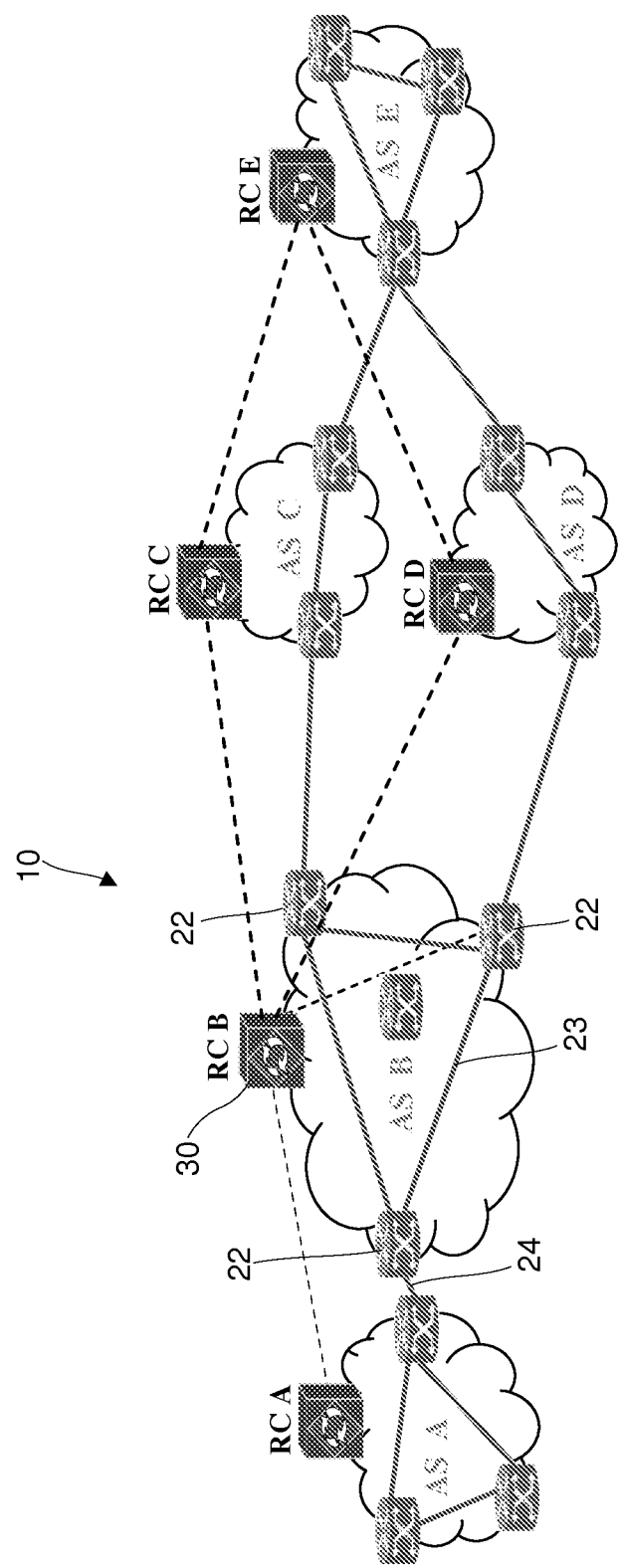
FIG. 1 shows an example of a multi-domain network.

FIG. 1 shows a multi-domain network topology 10 with five domains, also called Autonomous Systems (AS) AS A-AS E. In this description the terms "Autonomous System" and "domain" are used interchangeably. Each domain has one or more border nodes 22 which connect, via communication links 24, to border nodes in other domains. As an example, domain AS B has a border node 22 connecting to AS A, a border node 22 connecting to AS C and a border node 22 connecting to AS D. A routing control entity 30 is located in each Autonomous System AS. The routing control entity 30 is responsible for computing a path between domains. The routing control entity can be a Routing Controller (RC) as defined by the Optical Internetworking Forum (OIF) or a Path Computation Element (PCE) as defined in the Internet Engineering Taskforce's RFC4655. The routing control entity 30 is a logical entity with any suitable architecture (e.g. distributed, centralised). The routing control entity 30 can be implemented in the border node 22 or outside of the border node 22. Routing control entities 30 in different domains communicate with each other to share topology information which can be used to route traffic between domains. The communication among the routing control entities 30 can be performed by a specific protocol, such as the Path Computation Element Communication Protocol (PCEP).

Figure 2A:
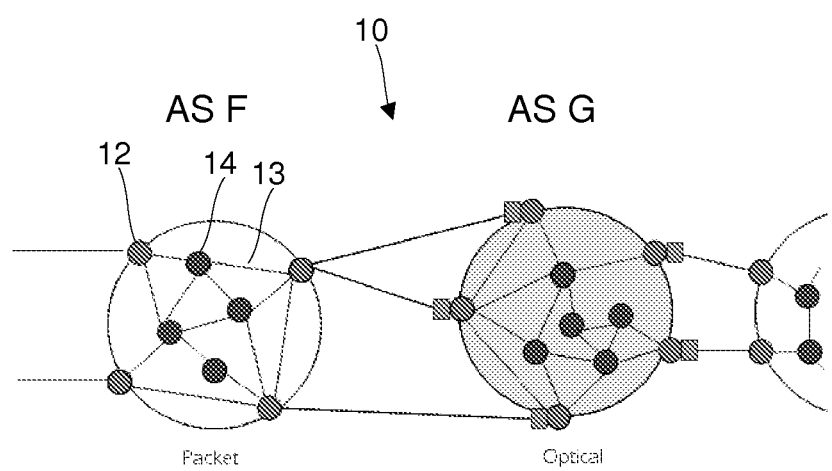
FIG. 2A shows some domain topologies and FIG. 2B shows summarised representations of the domain topologies.
Figure 2B:
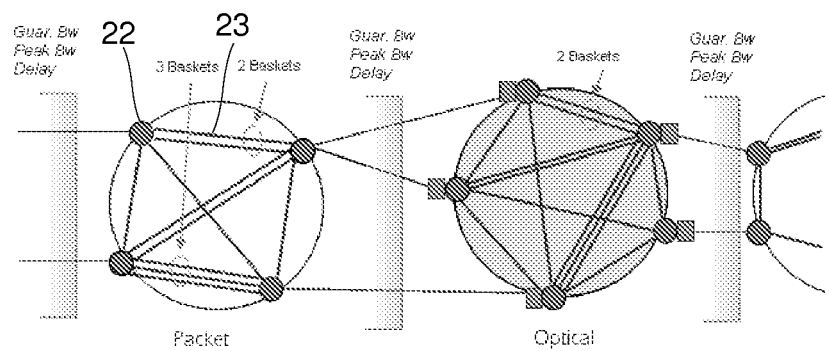

FIG. 1 shows each domain AS A-AS E as a virtual link 23, or a mesh of virtual links 23, between border nodes 22. This is a summarised, or abstracted, representation of the domain. It is a simplified topology that is advertised to other domains, and is not necessarily the actual topology of the domain. The actual topology is usually more complex. To illustrate summarisation, FIG. 2A shows two interconnected domains, AS F, AS G, and FIG. 2B shows the summarised representations of the same domains. In FIG. 2A, the actual topology of each domain comprises nodes 12 which interface with other domains and an intra-domain topology of internal nodes 14 and communication links 13 which connect the nodes 12, 14. In FIG. 2B, the internal nodes 14 and links 13 are replaced by a mesh of virtual links 23 between a set of border nodes 22. The border node 22 can also be called a summarised node. Each of the links 13 in the domain of FIG. 2A has parameter values which define the capacity and/or performance of the link, such as in terms of bandwidth and delay. In the summarised topology of FIG. 2B, each of the virtual links 23 has parameter values which are based on the parameter values of the actual links 13. The term "virtual link" is used to describe a direct link between border nodes in the summarised topology because a direct link with those parameters often will not exist between the pair of border nodes. Rather, the virtual link represents an indirect path, or a combination of paths between the border nodes in the actual topology of the domain.

Domains can have different technology types. FIGS. 2A and 2B show a domain AS F which uses packet technology and a domain AS G which uses optical technology. A packet-based technology such as Ethernet, Internet Protocol (IP) or Multi-Protocol Label Switching (MPLS) carries traffic within packets. Each node in the packet-based network forwards packets by inspecting a header within a received packet and performing a look-up in a store of forwarding information to determine how the packet should be forwarded. An optical technology such as Wavelength Switched Optical Network (WSON) supports end-to-end optical paths, called lambdas, between nodes requiring connection in the network. Intermediate nodes in this type of network support wavelength switching and may also support wavelength conversion. In a WSON setting up a lambda requires a Routing and Wavelength Assignment (RWA) process, often with some form of Impairment Validation to ensure the lambda has a sufficient quality. Accordingly, the timescale for setting up a connection in a WSON can be much longer than for setting up a connection in a packet-switched network. In summary, the technology types are very different in their operation and requirements. A border node 12, 22 may support conversion between technology types, thereby allowing packet-based traffic from domain AS F to be carried across an optical domain AS G.

In an embodiment of the present invention, a common set of parameters (metrics) are advertised between domains, irrespective of the particular technology (packet or optical) used within a domain. In the following embodiments packet and WSON are considered as particular technology types, although the invention is not limited to these. The common set of parameters among heterogeneous technologies simplifies operation of the multi-domain network, allowing a routing control entity 30 in a domain to process a common set of parameters.

Table 1 shows an example set of common parameters which can be advertised between domains. An advertised parameter can be "mandatory", i.e. it should be advertised by a domain. Advantageously, mandatory parameters are based on the requirements of services and User-Network Interface (UNI) parameters. Other, optional, parameters may also be advertised.

TABLE 1

| Common Parameters | |
|---|---|
| Parameter | Mandatory |
| Guaranteed Bandwidth | Yes |
| Peak Bandwidth | Yes |
| Delay | Yes |
| Recovery Scheme | No |
| Disjointness | No |
| Admin. Colour | No |

Advantageously, the common set of parameters have a common set of units. As an example, bandwidth values can be uniformly defined in Mbit/s, irrespective of whether the link is in a packet domain or an optical domain (where bandwidths are usually expressed in Gbit/s). Delay values can be uniformly defined in milliseconds (ms), irrespective of whether the link is in a packet domain or an optical domain. Other common parameters and units can be used in place of those described above.

Figure 3:
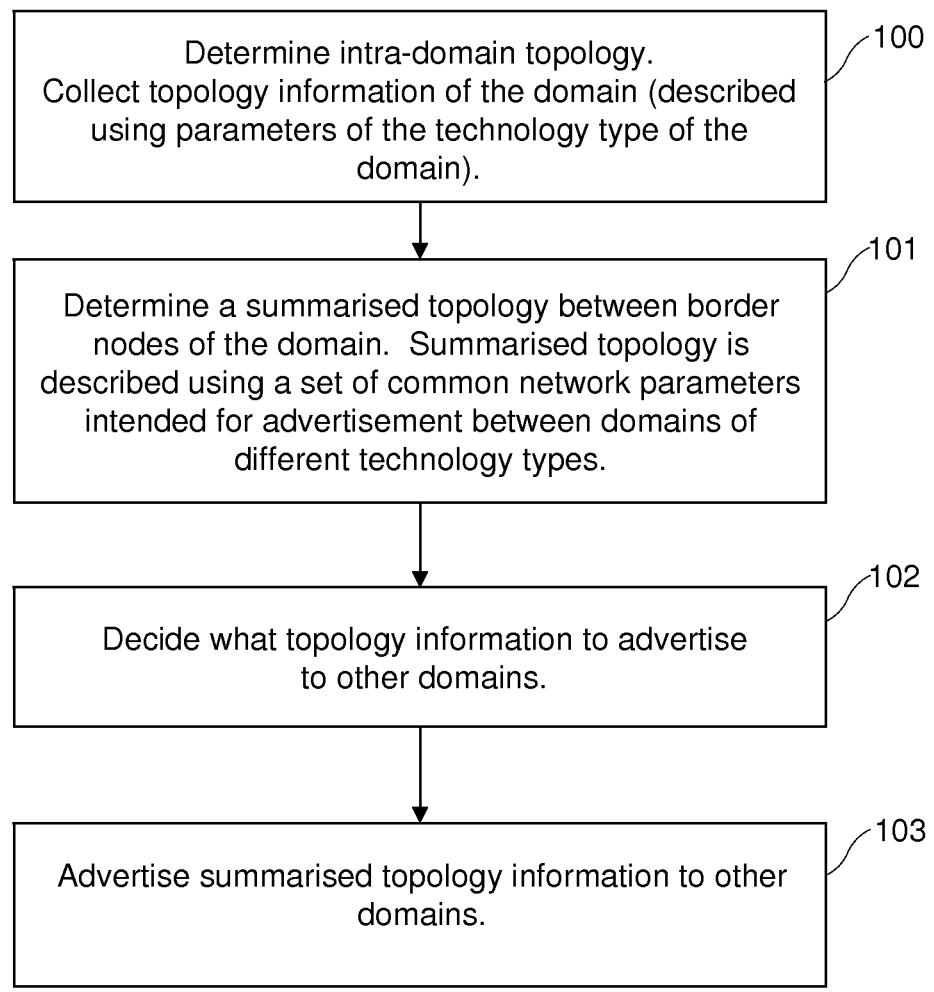
FIG. 3 shows a method of operating a domain.

FIG. 3 shows an overview of a method of operating a domain in a multi-domain network. The method comprises a step 100 of gathering intra-domain topology information to determine an intra-domain topology. This identifies the border nodes 12, and gathers information about the internal nodes 14, links 13 between nodes and the parameters associated with those links. Step 101 determines a summarised topology of the domain, of the type shown in FIG. 2B. The summarised topology has virtual links 23 between border nodes 22. There can be multiple virtual links 23 between a pair of border nodes 22. The multiple virtual links connect the same pair of border nodes 22 but differ in their parameter values. For example, the virtual links may have different values of delay, representing different length paths in the actual topology of the domain.

Step 102 determines what topology information to advertise to other domains for the purpose of inter-domain routing. The domain may have a policy of how much bandwidth should be made available to other domains for inter-domain routing. Step 103 advertises the summarised topology information to other domains. The topology information is described using a set of parameters, which is the same as the set of parameters advertised by other domains. If necessary, step 103, or an earlier step in the method of FIG. 3, converts the parameters obtained from the domain (step 100) into the common set of parameters that will be advertised. The summarised topology created at step 101 is described using a common set of parameters, i.e. a set of parameters which is used by all domains, irrespective of their technology type. The common set of parameters are derived from the topology information collected at step 100. Advantageously, each of the common set of parameters has a defined unit (e.g. Mb/s for bandwidth, ms for delay) and the parameters derived at step 101 are expressed in the defined units. The following table describes an advantageous set of common parameters (peak bandwidth, guaranteed bandwidth, delay) and how these are derived from parameters collected from a domain.

| Common parameter | Packet-switched Domain | Wavelength-switched domain |
|---|---|---|
| Peak bandwidth | =link with the minimum peak bandwidth along a path between border nodes | =bandwidth allocated to the wavelength channel (e.g. 2.5 G, 10 G, 40 G) |
| Guaranteed bandwidth | =link with the minimum guaranteed bandwidth along a path between border nodes | =bandwidth allocated to the wavelength channel (e.g. 2.5 G, 10 G, 40 G) |
| Delay | =sum of processing time along all nodes of a path between border nodes (transmission time ignored) | =sum of transmission times along all links in a path between border nodes |

Steps of the method are now described in more detail.

Intra Domain Summarisation

The summarised representation of the domain enables the domain to advertise a simplified connectivity of the domain instead of the full pattern of intra-domain paths. This provides other domains with sufficient information for traffic engineering purposes, while limiting the total amount of advertised information and preserving confidentiality of the domain's internal topology as multiple intra-domain paths are hidden to other domains. Multiple intra-domain paths can satisfy the parameter ranges which define each virtual link of the summarised topology. Multiple paths can be grouped in a "basket". The basket represents the class of equivalence for the advertisement of the connectivity ensured by the virtual link. The same range of values are considered for bandwidth and delay, so the paths belonging to the same baskets have bandwidth and delay within the considered range of values.

The definition of the basket is an asynchronous operation with respect to the inter-domain routing. Each domain can apply a proper policy/routing strategy to define the internal paths that will belong to the same basket. Some options for defining the paths belonging to a basket include:

- The domain computes, in advance, all of the possible paths which satisfy the ranges for the parameters defined for each basket. That is, the entire basket is filled with all the possible connectivity which comply with the basket "policies".
- The domain computes, in advance, only a portion of the possible paths. That is, a subset of paths is computed off-line in advance (pre-planned), while the other paths that can be used to satisfy the virtual connectivity, are computed while the network is operative. In this case, a portion of paths is pre-planned while the other paths are computed according to the use of the network resources. In this case, the domain can choose to select the more convenient path in the basket if it is available or can decide to compute, dynamically, a new path. The new path is computed on-line.
- The domain computes the path a group at a time in an asynchronous way with respect to the inter-domain routing. In this case each subset of paths is computed according the domain policy (e.g. when the amount of the paths in the basket is under a certain threshold or when it is empty, etc.)
- All paths are computed on-line without advance planning. In this case, for example, the domain defines the virtual connectivity, but the specific path to be used is computed after the inter-domain request.

The type of technology (packet or optical) used by the domain will impact which option, or options, among the three described above will be used. For example, routing in packet domains can be performed on-line, following a request from another domain while an optical domain will perform an off-line path computation, in advance of receiving a connection request from another domain due to the longer path set-up time and different bandwidth granularity. The inter-domain routing works on the summarised topology that is represented as homogeneous links and parameters, while each domain applies its own internal routing policies.

Some of the resources of the domain may be reserved for internal use and not available for inter-domain routing. The link parameter values used during the summarisation process reflect the resources that are available for inter-domain routing.

Examples are now given of calculating parameter values of the summarised links. For simplicity, three sequential steps to consider delay, guaranteed bandwidth and peak bandwidth are considered.

Delay

Figure 4:
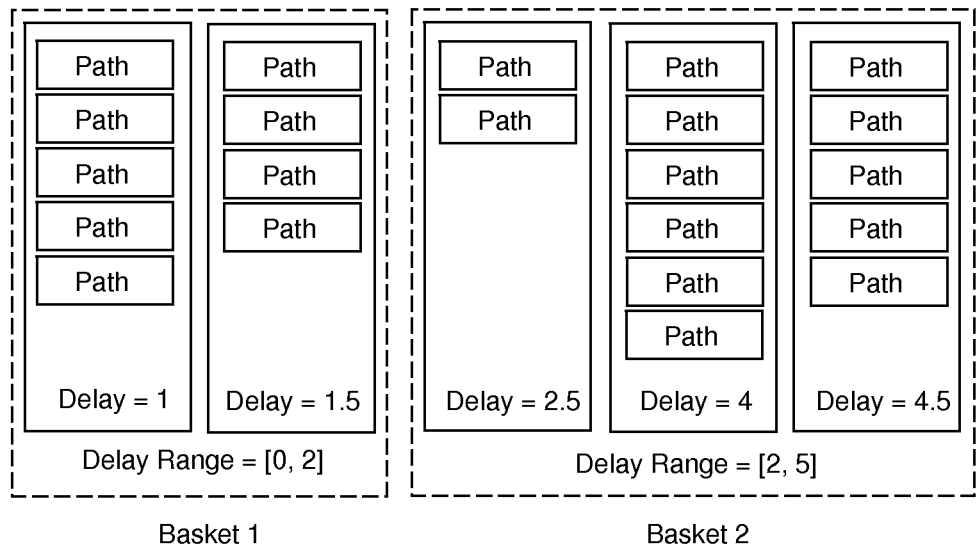
FIG. 4 shows summarisation of intra-domain paths based on delay.

FIG. 4 shows an example of a basket for the summarised topology of a domain. The basket is defined solely in terms of delay and considers the option where the domain computes all paths for each connectivity in advance. Paths between a pair of border nodes are considered. The summarisation algorithm has inspected the topology between the pair of border nodes and found 22 paths. Each path has a set of properties or parameters. Only the parameter "delay" is considered in FIG. 4. The paths are grouped in terms of their delay. Five paths offer a delay=1, four paths offer a delay=1.5, two paths offer a delay=2.5 and so on. Multiple paths which offer a particular value of delay are grouped together as a summarised link. In FIG. 4 there are five summarised links for the path between the pair of border nodes, one for each value of delay. In this example the total possible range of delay values is divided into two ranges: [0, 2] and [2, 5]. Each range of delay values is assigned to a basket. The five summarised links are associated to the relevant range: two links (delay=1, delay=1.5) are stored in the Basket 1 while the other three links (delay=2.5, delay=4, delay=4.5) are stored in Basket 2.

FIG. 4 shows a simple example where only delay has been considered. In a more complex example, each basket is defined in terms of a range of values for multiple parameters, such as a range of values for delay and a range of values for bandwidth. The parameters used to define the baskets are the set of common parameters that are used for inter-domain advertisement of topology information.

Guaranteed Bandwidth

Figure 5:
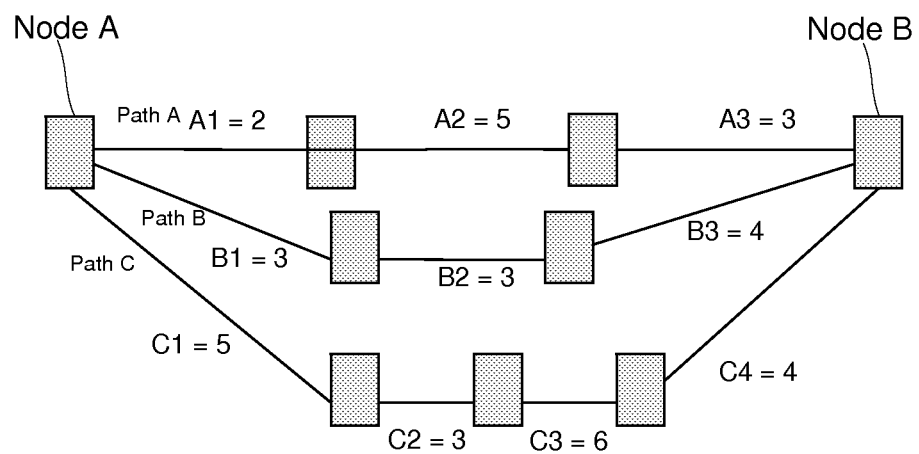
FIG. 5 shows multiple intra-domain paths.

FIG. 5 shows an example of computing guaranteed bandwidth. Consider paths between a pair of border nodes Node A, Node B. There are three different paths connecting the pair of border nodes within the packet domain shown in FIG. 2A. For example the path A is formed by a sequence of three links: A1, A2, A3; path B is formed by a sequence of three links: B1, B2, B3 and path C is formed by a sequence of four links: C1, C2, C3, C4. Bandwidth values are shown alongside each link.

An example method of forming a summarised link is to calculate a guaranteed bandwidth for the path between nodes A and B by considering the bandwidth value of the smallest link in the path. Table 2 shows the results of applying this criterion. Path A has a guaranteed bandwidth=2, because path A has links with bandwidth values 2, 3 and 5, and the bandwidth value of 2 is the smallest of these values. Similarly, path B has a guaranteed bandwidth=3 and path C has guaranteed bandwidth=3. The operator can decide to group the three paths in the same basket and provide one virtual link for inter-domain advertisement, with a guaranteed bandwidth value=2.

TABLE 2

Guaranteed Bandwidth Values

| Path | Guaranteed BW |
|------|---------------|
| A | 2 |
| B | 3 |
| C | 3 |

The bandwidth value for the virtual link remains unchanged until the guaranteed bandwidth of path A changes.

Peak Bandwidth

There are several possibilities for calculating the peak bandwidth. One possibility is to consider the peak value of any link in each of the paths. For the set of paths A, B, C shown in FIG. 5, this gives a peak bandwidth value=6, because this is the bandwidth of the link C3 which has the largest bandwidth in path C. Another possibility is to consider the peak value of the bandwidth that would be achieved for the end-to-end path, which gives a peak bandwidth value=3.

Consider a first case where the delay for each of the paths A, B, C in FIG. 5 is in the range ≤2. The virtual link representing the set of paths A, B, C between nodes A and B has the parameters: guaranteed bandwidth=2, peak bandwidth=3, delay=2. Consider another case where the paths A, B, C in FIG. 5 have the following delay values: path A=2, path B=7, path C=3. Path A and C are grouped in the same basket with delay=3, while path C belongs to another basket with delay=7.

For a domain using optical technology, the bandwidth of an intra-domain path can be defined as the bandwidth of the wavelength channel along the path (e.g. 2.5 Gbit/s, 10 Gb/s, etc.) In an optical domain, the wavelength continuity could be a constraint to be considered during the routing when wavelength conversion is not allowed. Technological specific constraints (e.g. wavelength continuity, physical impairments) are considered in the intra-domain routing to define which resources belong to the basket, but they are not considered in the inter-domain routing.

The number of paths belonging to the same basket depends on the level of configurability (e.g. lambda switching, tunable transponder, etc.) of the elements in the optical nodes. The higher the level of configurability, the higher the number of paths sharing the same virtual connection (i.e. the same basket).

Referring again to FIG. 2B, this shows the outcome of the summarisation process applied to a domain AS F and a domain AS G. The inter-domain connectivity of each domain is summarised by a set of virtual links 23 interconnecting the border nodes 22. The virtual links between border nodes are advertised to other nodes. Although the domains AS F, AS G use different technologies, and different intra-domain strategies can be used to define the baskets, the final summarisation allows a homogeneous end-to-end routing across multiple domains, defined in terms of the common set of parameters (guaranteed bandwidth, peak bandwidth, delay).

On the basis of the common parameters computation, all connections are organized in baskets. Connections belong to the same basket if they have parameter values within a certain range of values. The number of baskets (i.e. the corresponding connections) to be advertised depends on the policy of the domain. The packet domain aggregates in the same basket more connections and defines the parameters for each basket as:

the peak bandwidth is the minimum among the peak bandwidth of the paths belonging to the same basket;

the guaranteed bandwidth is the minimum among the guaranteed bandwidth of the paths belonging to the same basket;

the delay is the delay associated to each path belonging to the same basket.

The optical domain defines the basket and the corresponding parameters to be advertised as:

the peak bandwidth and the guaranteed bandwidth are considered as the sum of the bandwidth associated to the link belonging to the paths of the basket;

the delay is the maximum delay of one of the paths belonging to the same basket.

The parameters for each basket are expressed according to common units. Packet domain uses Mb/s for bandwidth and "ms" (milliseconds) for delay. Optical domain translates the bandwidth values (number of wavelengths in Mb/s) and the delay in "ms" (milliseconds).

Inter-domain Routing

Inter-domain routing uses the virtual links whose connectivity is advertised according to the relevant basket boundaries. The details about the paths belonging to the same basket within a domain are hidden to other domains. Specifically, other domains are unaware of: how many paths belong to the same basket; which criterion has been used to assign the parameters; and the criterion to select the physical paths to satisfy a request asked of each domain.

This method allows a different policy/strategy for inter-domain routing compared to a policy/strategy for intra-domain routing. The inter-domain routing could use a shortest path routing, while the intra-domain routing could apply a traffic balancing strategy to optimise intra-domain resource usage.

As multiple alternative intra-domain paths can satisfy the same virtual link, the advertisement at inter-domain level is reduced, in fact a virtual connectivity is available for inter-domain up to no resources are available within intra-domain. Assume a bandwidth X can be provided with Y paths in the same basket, such bandwidth X remains available for inter-domain routing as long as the domain has sufficient resources to refill the basket. This means that the inter-domain routing uses a topology that is stable enough, while the single domain adopts proper strategy to handle internal resources.

Figure 6:
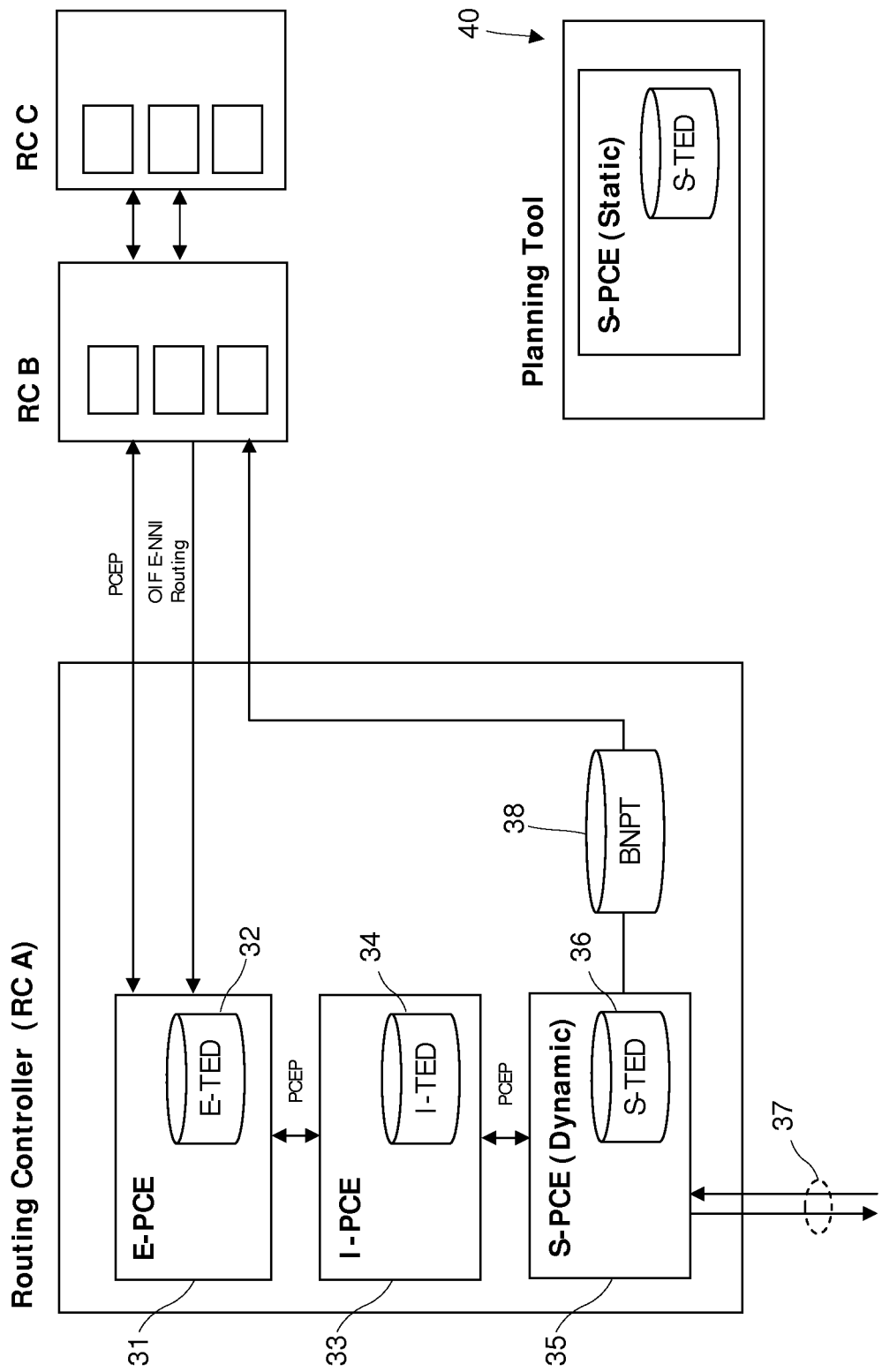
FIG. 6 shows functional units to perform the method according to an embodiment of the invention.

FIG. 6 shows an example way in which the described functionality can be implemented in a domain. The computation required by the method can be performed by a Routing Controller, a planning tool, a management element or a combination of these. FIG. 6 shows a Routing Controller RC A for a domain AS A. RC A communicates with similar entities RC B, RC C in other domains. The Routing Controller RC A comprises the following functional units:

Summarisation Path Computation Element (S-PCE): this unit performs the path computation to summarise the topology of the domain AS A and maintains a database S-TED of summarised topology data. S-PCE can be partially, or fully, off-line (i.e. part of a planning tool 40) or can be included in the RC A, as shown in FIG. 6.

External Path Computation Element (E-PCE): this unit performs the path computation to provide end-to-end inter-domain connectivity. E-PCE communicates with similar units in RC B and RC C using a protocol such as, for example, the Path Computation Element Communication Protocol (PCEP). E-PCE maintains a Traffic Engineering Database E-TED of inter-domain topology data.

Internal Path Computation Element (I-PCE): the unit performs the path computation to serve the advertised intra-domain connectivity.

These functional units can cooperate using, for example, a PCEP protocol. Although individual databases E-TED, I-TED, S-TED have been shown, the data sets of these databases may be stored in a common physical database.

It will now be described how the method is performed by the units shown in FIG. 6.

Step 1—Summarisation

The S-PCE identifies the border nodes of the controlled domains as "summarised nodes" and, for each pair of border nodes, creates a summarised link, or links, between the border nodes. S-PCE aggregates paths with similar parameters in the same basket (i.e. paths with delay parameters can be put in the same basket). This process uses the common parameters described above. Finally, the S-PCE configures these links as a mesh. From now on, the connectivity between the border nodes is represented using the virtual links and the relevant baskets. There are alternative ways of implementing Step 1:

the domain computes, in advance, all of the possible paths which satisfy the ranges for the parameters defined for each basket;

the domain computes, in advance, only a portion of such paths. The other paths are computed dynamically according to the use of the network resources.

all paths are computed on-line without planning.

An S-PCE in an off-line planning tool 40 is used to pre-compute paths. An on-line S-PCE in the RC is used to compute paths on demand. In a typical network there is a planning phase where the resources are organised. The S-PCE (Static) can work during the planning phase to define the baskets, based on the topology and topology parameters of the network. At that time the baskets can be empty and the physical path belonging to such basket is computed when the routing in the traffic domain is performed.

Step 2—Advertisement

The RC advertises summarised intra-domain routing information. The RC has a summarised view of the controlled domain and can choose to show all, or a part, of the summarised network outside the domain itself in the advertisement phase. For example, the RC may choose to advertise a portion of the total bandwidth of a summarised link as being available for inter-domain routing. The RC stores information that it wishes to share in a Border Node Path Table (BNPT) 38 and advertises to other domains, for each BN-BN path, the related computed attributes including the TE Metric. Advertisement can use the PCEP protocol or extensions of the Open Shortest Path First (OSPF) protocol.

Step 3—Path Computation Upon Request

According to the advertised TE Metric, a RC belonging to a different domain may request the provisioning of an inter-domain connection. The RC maps the received inter-domain request to an intra-domain request between the identified BNs. Then, it processes the request using the I-PCE including the required TE attributes (i.e. bandwidth) and the TE Metric previously advertised outside (in Step 2). The path used to serve the required connection can be the one associated to the advertised value or can be different (according to the current domain status).

The E-PCE works on the summarised vision of the multiple domains and performs the inter-domain path computing. Then according to the multi-domain architecture (e.g. OIF or multi-hierarchical PCE) the set-up of the path is performed. For example, in case of OIF this requires sending an RSVP session to the border nodes of each domain belonging to the inter-domain path. When the border node (e.g. RC in case of OIF) receives the summarised path set-up request for connectivity in that domain, there are two possibilities:

a) if the basket corresponding to the selected connectivity has resources, than one path of such basket is selected (different criterion can be used for that)

b) the basket corresponding to the selected connectivity is empty or the policy of the domain is not having pre-computed paths, then the I-PCE computes the paths for that.

Figure 7:
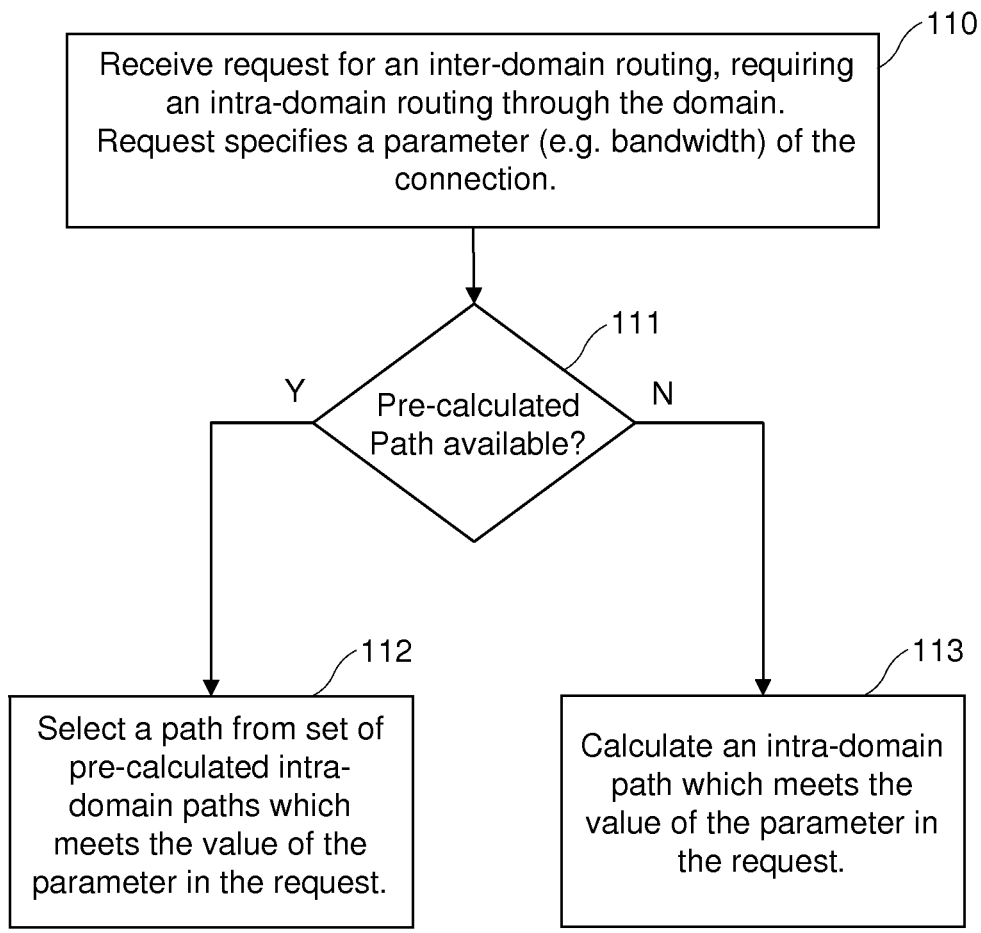
FIG. 7 shows a method of responding to requests for inter-domain routing.

In case a), when the available number of paths in the basket falls below a threshold value, the I-PCE is triggered to compute new paths for the basket. If the I-PCE is unable to find further paths, due to a lack of available resources, then this is signalled (e.g. by internal and external OSPF signalling) and both the intra-domain and inter-domain TE databases are updated. FIG. 7 summarises this method. A request for an inter-domain routing is received at step 110. The inter-domain routing requires an intra-domain routing through the domain and specifies a parameter, or parameters, of the required connection. Step 111 checks if a pre-calculated path is available meeting the parameters in the request. If so, the method proceeds to step 112 and selects a path a set of pre-calculated intra-domain paths. If not, an intra-domain path is calculated on demand at step 113.

The described scheme allows asynchronous routing operations among domains which are heterogeneous in terms of technology (i.e. packet and optical technology) and control plane (i.e. multi-layer and single layer).

Multi-layer Domains

In the above embodiments each domain has been considered as a homogeneous domain with a single technology type (e.g. packet or optical). However, a domain can comprise a mix of different technology types. A domain may comprise multiple layers, such as an optical layer and an overlying packet-switched layer. This type of multi-layer domain will now be considered in detail.

In a multi-layer/multi-technology domain, with several switching capabilities, one for each layer, each layer is summarised as connectivity with a certain set of parameters. In addition, one or more cross-layer parameters represent how the use of one layer impacts the other layer, or layers. For each technology type used within a domain, the domain derives, and advertises, one or a set of common parameters, as described above for single technology domains.

The method allows representing the intra-domain topology as composed by separated networks with associated specific parameters that are common to other domains. The cross-layer parameters allow evaluating which is the most convenient technology to be used in a simple way, while the representation of separated network allows to simplify the routing and the path set-up.

This method allows to easily represent both case where the border nodes are multi-layer or the case where the multi-layer domains has border nodes with just one switching capability and the nodes with other switching capability are internal nodes. Moreover the methods allow to easily represent the case where the border nodes have several adaptation capability. Such method allows to keep scalability, confidentiality while allows to provide the information for traffic engineering routing.

Figure 8:
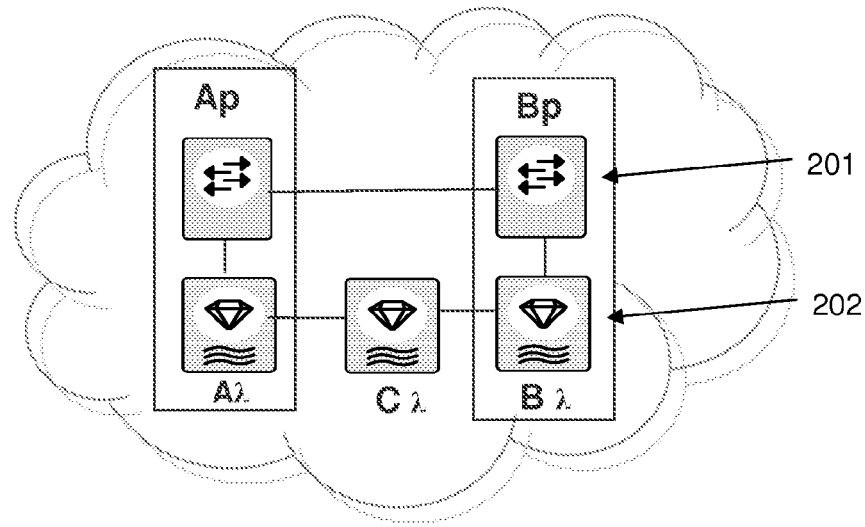
FIG. 8 shows a domain having a packet-switched layer and a wavelength-switched layer.

FIG. 8 shows an example of a multi-layer network with a packet-switched layer 201 over a wavelength-switched layer 202. Two connectivity types are advertised: the first one relates to the packet-switching capability (PSC) in switches $A_p$, $B_p$, while the second one relates to lambda-switching capability (LSC) in switches ($A\lambda$, $B\lambda$ and $C\lambda$). Consider the bandwidth (BW) as an advertised parameter. The BW parameter for the LSC network 202 is 10 Gb/s and the BW parameter for the PSC is 1 Gb/s. As node A and node B are multi-layer nodes, if PSC bandwidth is requested, the domain can use optical connectivity to connect $A_p$ with $B_p$. This means that the connection between $A_p$ and $B_p$ is obtained by an optical layer path between switches Aλ and Bλ. In this case, the cross-layer parameter BW is 1 Gb/s. This means that in a case where packet connectivity is requested, the bandwidth for the optical connectivity is reduced by 1 Gb/s. In a case where optical connectivity is requested (e.g. a 10 Gb/s connection), the bandwidth for packet connectivity is not available any more and the cross-layer parameter is updated to reflect this.

Figure 9A:
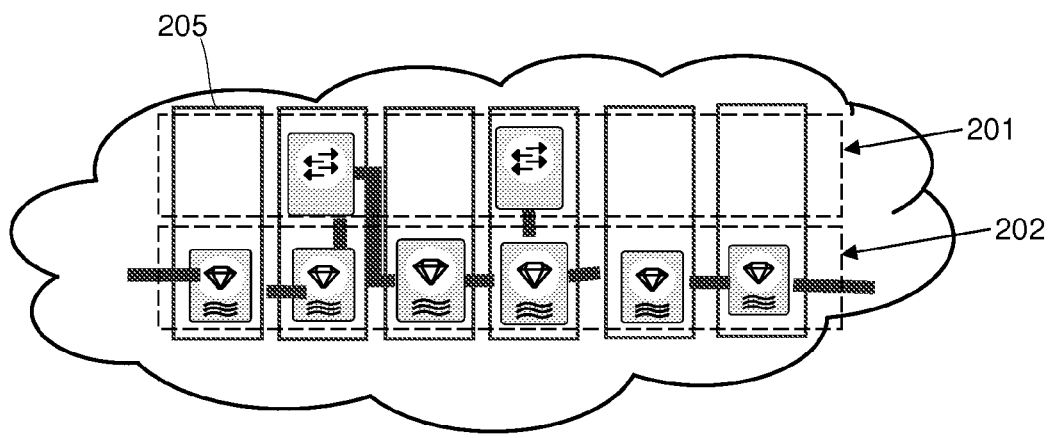
FIG. 9A shows a domain having a packet-switched layer and a wavelength-switched layer, with border nodes of one technology type.
Figure 9B:
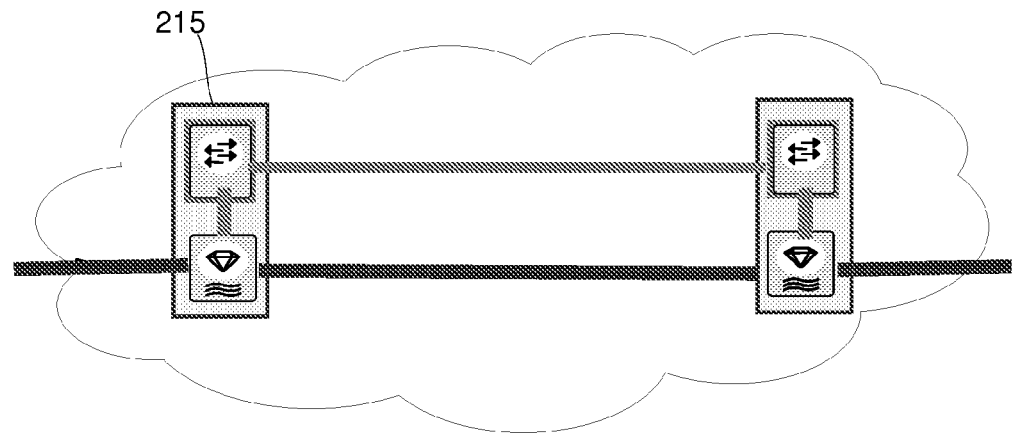
FIG. 9B shows a summarised representation of the domain of FIG. 9A.

Both connectivity and the border node allowing reaching such connectivity are advertised. This means that in case a border node is multi-layer (as in FIG. 8) there is a real correspondence between the real border node and the summarised border node. In case the border node has a switching capability different with respect the switching capability that the domain wants to advertise, a virtualised border node is considered. FIG. 9A shows a domain with two layers of switching capabilities (PSC and LSC). A border node 205 only has wavelength-switching capability. Suppose that the domain wants to advertise both layers of switching capability. The summarisation process represents the domain as shown in FIG. 9B, where the border nodes 215 are virtualised. This means that the external domains are aware about the possibility to use both PSC and LSC switching capability using the same external link. The virtualised border node is advertised as a node that allows reaching all layers of the domain. In case of FIG. 9B, the virtual border node 215 represents the node that allows reaching both LSC nodes those PSC nodes. In this last case the cross-layer parameters (e.g. bandwidth) between LSC and PSC allow to easily represent internal PSC nodes/links as virtual links and nodes. Due to the virtualisation of nodes and links, the representation of the scenario of FIG. 9A can be similar to the representation of FIG. 8.

The two technologies (PSC, LSC) are presented as separated connectivity on the same domain. Some internal physical paths are dependent on two technologies. For example, to form a connection between two packet nodes Ap, Bp in FIG. 8 optical connectivity must be used. The cross-layer parameters describe this dependency between layers. For example, a portion of the bandwidth of an optical connection between Aλ, Bλ can be used to provide a packet connection. In summary, the intra-domain summarisation for each technology layer is separated and the cross-layer parameters describes the dependency of the two layers.

Some examples will be considered to more fully explain embodiments of the invention.

Case A: border nodes have capability of switching at multiple technology layers (PSC, LSC). Referring back to the method shown in FIG. 3, step 100 collects topology information including network parameters for path and cross-layer parameters between the two technologies (e.g. bandwidth shared between the two technologies). Step 101 creates a summarised topology for each of the technologies, separately maintaining the parameters and cross-layer parameters for each path. Step 102 decides what topology information for each technology to advertise to other domains, including cross-layer parameters. It can be seen that the multi-layer case is very similar to the single-layer case described earlier. Each layer is summarised separately. Cross-layer parameters describe the dependency between the layers.

Case B: border nodes are single technologies (e.g. optical) and the domain is multi-layer (some internal nodes are multi-layer, such as packet over optical). Two sub-cases are considered:

B1: internal policy of the domain is not to advertise the double connectivity (e.g. packet and optical). Referring back to the method shown in FIG. 3, step 100 is the same as case A above. Step 101 creates a summarized topology for the technology, maintaining separate parameters and cross-layer parameters for each path. Step 102 decides what topology information for each technology to advertise to other domains keeping hidden the cross-layer parameters.

B2: internal policy of the domain is to advertise the double connectivity (e.g. packet and optical). Referring back to the method shown in FIG. 3, step 100 is the same as case A above. Step 101 is the same as case B1. Step 102 is the same as case A above.

The method to perform internal routing according to rules defined above is based on the concept that the intra-domain multi-layer/multi-region resources are organised in order to have resources dedicated for each switching capability and resources that impact more switching capability concurrently. Such relation among the several switching capability varies dynamically according to the routes selected to accommodate traffic during network life. This method allows applying whatever internal routing approach: for example a multi-layer routing that computes path on more layers concurrently, or separated routing for the several layers. In any case it is possible to identify the portion of resources dedicated to specific switching capability and that one impacting more switching capability concurrently.

The proposed scheme allows a multi-layer domain to be summarised in order to inter-work with other heterogeneous domain both from technology and control plane point of view. The scheme allows simple inter-domain routing to be performed while it is possible to keep a high level of scalability, preserve confidentiality and perform traffic engineering both at intra-domain level and at inter-domain level. The scheme allows summarising in the case where the border nodes have several adaptation capabilities. This method allows applying different internal routing approaches. For example, a multi-layer routing that computes path on more layers concurrently, or separated routing for the several layers. It is possible to identify the portion of resources dedicated to specific switching capability and that one impacting more switching capability concurrently.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of generating network topology parameters for a first network domain in a multi-domain network, the first network domain comprising a plurality of network nodes connected by links and comprising border nodes which connect with other network domains, the first network domain comprising apparatus of a first network technology type, the method comprising, at a control entity of the first network domain:

determining an intra-domain topology of the nodes and links of the first network domain by collecting values of at least one network topology parameter of the first technology type; and determining a summarised intra-domain topology of paths between border nodes of the first network domain which is described using values of at least one summarised network topology parameter, wherein values of the summarised network topology parameter are derived from the values of the network topology parameter of the intra-domain topology of the first technology type and wherein the summarised network topology parameter is part of a common set of network topology parameters for advertising between domains comprising apparatus of different technology types, wherein the different technology types comprise packet-switched network technology and wavelength-switched optical network technology, wherein the summarized intra-domain topology of paths comprises a plurality of virtual links between a pair of border nodes, each virtual link representing a plurality of possible intra-domain paths between the pair of border nodes, each virtual link being described by a different value or value range of the summarized network topology parameter, and wherein the common set of network topology parameters are expressed in units that are the same irrespective of technology type.

2. A method according to claim 1 wherein the common set of network topology parameters comprises mandatory parameters, which must be advertised to other domains, and optional parameters.

3. A method according to claim 1 wherein, where there are a plurality of network domain paths between a pair of border nodes, the method further comprises grouping the network domain paths according to value, or value ranges, of the summarised network topology parameter.

4. A method according to claim 3 wherein the value ranges are determined by an internal policy of the network domain, independent of other network domains.

5. A method according to claim 1 wherein the step of determining a summarised intra-domain topology of paths calculates a limited set of paths and the method further comprises calculating additional intra-domain paths based on an amount of unallocated resources in the summarised intra-domain topology of paths.

6. A method according to claim 1 further comprising advertising a path of the summarised intra-domain topology to another network domain by specifying a value, or value range, of the least one summarised network topology parameter for the intra-domain path.

7. A method according to claim 6 further comprising determining an amount of resources to advertise, before advertising the path of the summarised intra-domain topology.

8. A method according to claim 1 wherein the step of determining a summarised intra-domain topology of paths uses a rule set which is the same as a rule set used by another network domain.

9. A method according to claim 8 wherein the rule set is the same as a rule set of another network domain comprising apparatus of a different network technology type.

10. A method according to claim 1 wherein the first domain comprises at least two layers of different technology type and the method further comprises determining a cross-layer parameter indicative of dependency between the layers of different technology types.

11. A method according to claim 10 wherein the cross-layer parameter is indicative of the effect on one of the layers caused by carrying traffic on another of the layers.

12. A method according to claim 1 wherein at least some internal nodes of the first domain support a set of at least two layers of different technology type and the border nodes support a more restricted subset of the set of at least two layers of different technology type, the step of determining a summarised intra-domain topology of paths comprises summarising a border node as a virtual border node which has connectivity to a layer of a technology type not forming part of the subset.

13. A method according to claim 1 wherein the at least one summarised network topology parameter is an end-to-end service-based parameter.

14. A method according to claim 1 wherein the at least one network topology parameter comprises at least one of: guaranteed bandwidth, peak bandwidth, delay.

15. A method of operating a route advertising control entity of a first network domain in a multi-domain network, the first network domain comprising a plurality of network nodes connected by links, the first network domain comprising apparatus of a first network technology type, the method comprising:

advertising a value, or value range, of a summarised network topology parameter for a virtual link of a summarised intra-domain topology of paths between border nodes of the first domain to another network domain of a second, different technology type, wherein the value, or value range, of the summarised network topology parameter has been calculated using the method according to claim 1.

16. A method of operating a routing control entity of a first network domain in a multi-domain network, the first network domain comprising a plurality of network nodes connected by links and comprising border nodes which connect with other network domains, the network domain comprising apparatus of a first network technology type, the method comprising:

receiving a request for an intra-domain routing between the border nodes of the first network domain as part of an inter-domain routing between end nodes, the request specifying an advertised value, or value range, of a summarised network topology parameter for a virtual link between the border nodes for the routing, wherein the summarised network topology parameter is part of a common set of network topology parameters used by domains of different technology types, wherein the different technology types comprise packet-switched network technology and wavelength-switched optical network technology and wherein a summarized network topology of paths comprises a plurality of virtual links between a pair of border nodes, each virtual link representing a plurality of possible intra-domain paths between the pair of border nodes, each virtual link being described by a different value or value range of the summarized network topology parameter; and determining an intra-domain path between the border nodes which meets the requested value, or value range, of the summarised network topology parameter, wherein the common set of network topology parameters are expressed in units that are the same irrespective of technology type.

17. A method according to claim 16 wherein the step of determining an intra-domain path between the border nodes selects the intra-domain path from a set of pre-calculated intra-domain paths.

18. A method according to claim 16 further comprising causing a control entity to calculate intra-domain paths based on an amount of unallocated resources in the set of pre-calculated intra-domain paths.

19. A method according to claim 18 wherein the step of determining an intra-domain path between the border nodes causes a control entity to calculate, on demand, an intra-domain path which meets the value, or value range, of the summarised network topology parameter in the request.

20. A non-transitory machine readable storage medium having stored therein instructions which, when executed by a processor, cause the processor to perform a method of generating network topology parameters for a first network domain in a multi-domain network, the first network domain comprising a plurality of network nodes connected by links and comprising border nodes which connect with other network domains, the first network domain comprising apparatus of a first network technology type, the method comprising, at a control entity of the first network domain:

determining an intra-domain topology of the nodes and links of the first network domain by collecting values of at least one network topology parameter of the first technology type; and determining a summarised intra-domain topology of paths between border nodes of the first network domain which is described using values of at least one summarised network topology parameter, wherein values of the summarised network topology parameter are derived from the values of the network topology parameter of the intra-domain topology of the first technology type and wherein the summarised network topology parameter is part of a common set of network topology parameters for advertising between domains comprising apparatus of different technology types, wherein the different technology types comprise packet-switched network technology and wavelength-switched optical network technology, wherein the summarized intra-domain topology of paths comprises a plurality of virtual links between a pair of border nodes, each virtual link representing a plurality of possible intra-domain paths between the pair of border nodes, each virtual link being described by a different value or value range of the summarized network topology parameter, and wherein the common set of network topology parameters are expressed in units that are the same irrespective of technology type.

21. Apparatus for generating network topology parameters for a first network domain in a multi-domain network, the first network domain comprising a plurality of network nodes connected by links and comprising border nodes which connect with other network domains, the first network domain comprising apparatus of a first network technology type, the apparatus comprising a processing apparatus and memory which is arranged to:

determine an intra-domain topology of the nodes and links of the first network domain by collecting values of at least one network topology parameter of the first technology type; and determine a summarised intra-domain topology of paths between border nodes of the first network domain which is described using values of at least one summarised network topology parameter, wherein values of the summarised network topology parameter are derived from the values of the network topology parameter of the intra-domain topology of the first technology type and wherein the summarised network topology parameter is part of a common set of network topology parameters for advertising between domains comprising apparatus of different technology types, wherein the different technology types comprise packet-switched network technology and wavelength-switched optical network technology, wherein the summarized intra-domain topology of paths comprises a plurality of virtual links between a pair of border nodes, each virtual link representing a plurality of possible intra-domain paths between the pair of border nodes, each virtual link being described by a different value or value range of the summarized network topology parameter, and wherein the common set of network topology parameters are expressed in units that are the same irrespective of technology type.

22. A routing control entity of a first network domain in a multi-domain network, the first network domain comprising a plurality of network nodes connected by links and comprising border nodes which connect with other network domains, the network domain comprising apparatus of a first network technology type, the routing control entity comprising a processing apparatus and memory which is arranged to:

receive a request for an intra-domain routing between the border nodes of the first network domain as part of an inter-domain routing between end nodes, the request specifying an advertised value, or value range, of a summarised network topology parameter for a virtual link between the border nodes for the routing, wherein the summarised network topology parameter is part of a common set of network topology parameters used by domains of different technology types, wherein the different technology types comprise packet-switched network technology and wavelength-switched optical network technology and wherein a summarized network topology of paths comprises a plurality of virtual links between a pair of border nodes, each virtual link representing a plurality of possible intra-domain paths between the pair of border nodes, each virtual link being described by a different value or value range of the summarized network topology parameter; and determine an intra-domain path between the border nodes which meets the requested value, or value range, of the summarised network topology parameter, wherein the common set of network topology parameters are expressed in units that are the same irrespective of technology type.

* * * * *